United States Patent [19]
Arie et al.

[11] Patent Number: 5,756,900
[45] Date of Patent: May 26, 1998

[54] PRESSURE SENSING APPARATUS

[75] Inventors: Nobuyuki Arie, Tokyo; Tomiki Ogi, Sagamihara, both of Japan

[73] Assignees: Tasco Japan Co., Ltd., Tokyo; Act Engineering Co., Ltd., Sagamihara, both of Japan

[21] Appl. No.: 788,296

[22] Filed: Jan. 24, 1997

Related U.S. Application Data

[63] Continuation of Ser. No. 341,951, Nov. 16, 1994, abandoned.

[30] Foreign Application Priority Data

Dec. 28, 1993 [JP] Japan ................... 5-353787

[51] Int. Cl.$^6$ ................... G01L 7/00; G01L 9/00
[52] U.S. Cl. ................... 73/756
[58] Field of Search ................... 73/756, 861.47, 73/861.62, 861.63

[56] References Cited

U.S. PATENT DOCUMENTS

| | | | |
|---|---|---|---|
| 2,930,236 | 3/1960 | Taber | 73/756 |
| 4,896,542 | 1/1990 | Hunter | 73/861.63 |
| 4,938,077 | 7/1990 | Robinet | 73/861.62 |
| 5,295,747 | 3/1994 | Vinci | 73/756 |
| 5,410,916 | 5/1995 | Cook | 73/756 |

*Primary Examiner*—William L. Oen
*Attorney, Agent, or Firm*—Jacobson, Price, Holman & Stern, PLLC

[57] ABSTRACT

There is provided a pressure sensing apparatus that does not trap any fluid within its flow path and has a simple construction so that it can be manufactured at reduced cost and has a diaphragm that operates stably. Such a pressure sensing apparatus comprises a sensor holder 21 having a flow path 22 arranged therein and provided with a flat surface area 25 and a sensor receiving hole 23 cut from the outer periphery of the sensor holder to the flat surface area 25 of the flow path 25. The apparatus also comprises a diaphragm 24 that is level with the flat surface area 25 and has an even thickness. A pressure sensor 31 arranged in the sensor receiving hole 23. Since a pressure sensing apparatus having a configuration as described above does not have any recess that can trap fluid within the flow path 22, it does not degrade the purity and cleanliness of the fluid running therethrough, if it is connected to a piping system for fluid that requires purging. Additionally, the fluid running through the flow path 22 of the sensor holder 21 does not produce turbulences because of the streamlined profile of the flow path 22 and, since the diaphragm 24 is integral with the sensor holder, no operation is required to fit the diaphragm 24 to the sensor holder 21 and hermetically seal the sensor holder 21 at the connection of the diaphragm 24.

5 Claims, 2 Drawing Sheets

PRESSURE SENSING APPARATUS

This is a continuation of application Ser. No. 08/341,951, filed Nov. 16, 1994 which was abandoned upon the filing hereof.

BACKGROUND OF THE INVENTION

1. Field of the Invention

This invention relates to a pressure sensing apparatus and, more particularly, it relates to an improvement on a pressure sensing apparatus to be fitted to a fluid piping system.

2. Prior Art

Pressure sensors designed for pressure control and flow rate control are mostly realized by combining a diaphragm and a device for translating changes in the pressure into those device in the electric resistance or capacitance.

Pressure sensors of the above-identified type are popularly used because they are small, have a simple mechanical construction and comprises only small movable components.

It is well known that pressure sensors are favorably installed in piping systems for supplying atmospheric and purging gases in the semiconductor industry where a suitable environment needs to be established for the manufacture of devices.

FIGS. 4 and 5 schematically illustrate a piping system provided with a pressure sensor. Referring to FIG. 4, a gas source 1 and a gas consuming installation 2 are connected with each other by way of a primary-side gas feeding path 3, a secondary-side gas feeding path 4 and a sensor holder 5 disposed between the paths.

As shown in FIG. 5, the sensor holder 5 is provided with a flow path 6 having a circular cross section, a sensor receiving hole 7 also having a circular cross section and arranged perpendicular to the flow path 6, a diaphragm 8 arranged at the crossing of the path 6 and the hole 7 and a casing 9 arranged on a lateral side of the holder 5 where the sensor receiving hole 7 has an end thereof.

Referring again to FIG. 4, a pressure sensor 11 comprising a strain gauge as a principal component thereof is placed in the sensor receiving hole 7 of the sensor holder 5. The arrangement of the pressure sensor 11 in the sensor receiving hole is more clearly shown in FIG. 5.

As shown in FIG. 4, the pressure sensor 11 is provided with an indicator 12 comprising an amplifier, display and other components.

As gas is fed to the consuming installation 2 from the gas source 1 by way of the primary-side gas feeding path 3, the sensor holder 5 and the secondary-side gas feeding path 4, the diaphragm 8 is deformed under the gas pressure.

Then, the pressure sensor 11 fitted to the sensor holder 5 detects the strain generated in the diaphragm 8 under gas pressure and causes the indicator 12 to display the gas pressure that has given rise to strain so that the operator of the piping system can check and see if gas pressure is found within a determined range.

(Problems to be solved by the Invention) A known pressure sensing apparatus having a configuration as described above, however, is accompanied by the following problems that are attributable to the construction of the sensor holder 5.

(Problem 1)

Firstly, since the flow path 6 has a circular or curved peripheral surface and the diaphragm 8 has a bottom surface, it presents a a recess 10 as shown in FIG. 5 that traps gas there and prevents it from flowing away.

Any gas trapped in the recess can contaminate the atmospheric gas passing through the piping system and degrade the purity of the gas to adversely and vitally affect the quality of the final products.

(Problem 2)

Secondly, since the flow path 6 has a circular cross section, it is highly difficult to form a diaphragm 8 integrally with a sensor holder 5 that can be snugly placed in position.

Inevitably, the diaphragm 8 and the sensor holder 5 need to be prepared separately and subsequently assembled together. This means that a large number of steps are required for manufacturing the components of the pressure sensing apparatus, assembling them and sealing the manufactured apparatus to consequently push up the manufacturing cost of the the apparatus.

(Problem 3)

Finally, since the flow path 6 has a recess 10 at an important position (located near the bottom of the diaphragm 8) that interferes with a smooth flow of gas, it is difficult for the diaphragm 8 to operate stably and errors may inevitably be involved in the pressure sensing operation of the apparatus.

These and other problems are commonly observed in pressure sensing apparatuses that are installed in piping systems for corrosive fluid (gas or liquid) or readily solidifying liquid.

(Object of the Invention)

In view of the above-identified technological problems, it is therefore an object of the present invention to provide an improved pressure sensing apparatus that does not trap any fluid in the flow path of the apparatus while it comprises a simply configured diaphragm that operates stably and, at the same time, allows to reduce the overall cost of the apparatus.

SUMMARY OF THE INVENTION

According to the invention, the above object of the invention is achieved by providing a pressure sensing apparatus comprising a sensor holder having a flow path running therethrough and a pressure sensor arranged in the sensor holder characterized in that the sensor holder has on at least part of the inner surface of the flow path a flat surface area directed along the flow path and a sensor receiving hole formed from its outer surface toward the flat surface area, that a diaphragm having an even thickness is disposed between the flat surface area of the flow path and the bottom of the sensor receiving hole, the inner surface of the diaphragm being level with the flat surface area of the flow path, and that the pressure sensor is disposed in the sensor receiving hole of the sensor holder.

The flow path running through the sensor holder preferably has a polygonal cross section or an arcuate cross section having a straight line as part of the circumference.

(Function)

A pressure sensing apparatus according to the invention is designed to be installed in a piping system for fluid.

Once the pressure sensing apparatus is installed in position, the inner surface of the flow path of the sensor holder is subjected to the pressure of the fluid running therethrough and through the piping system to produce a strain therein as a function of the fluid pressure, which is detected by the pressure sensor arranged in the sensor receiving hole of the sensor holder.

Since the inner surface of the diaphragm is level with the flat surface area of the flow path of the pressure sensing apparatus, the flow path of the apparatus does not present any recess that may adversely affect the flow of liquid in the apparatus Since the flow path does not have any recess thereon, fluid can flow smoothly through the flow path of the sensor holder so that no fluid may be trapped within the flow path to adversely affect the operation of purging the inside and consequently the diaphragm operates stably under the pressure of the fluid running through the flow path.

Now, the present invention will be described in greater detail by referring to the accompanying drawings that illustrate preferred embodiments of the invention.

DETAILED DESCRIPTION OF THE INVENTION

Figure 1:
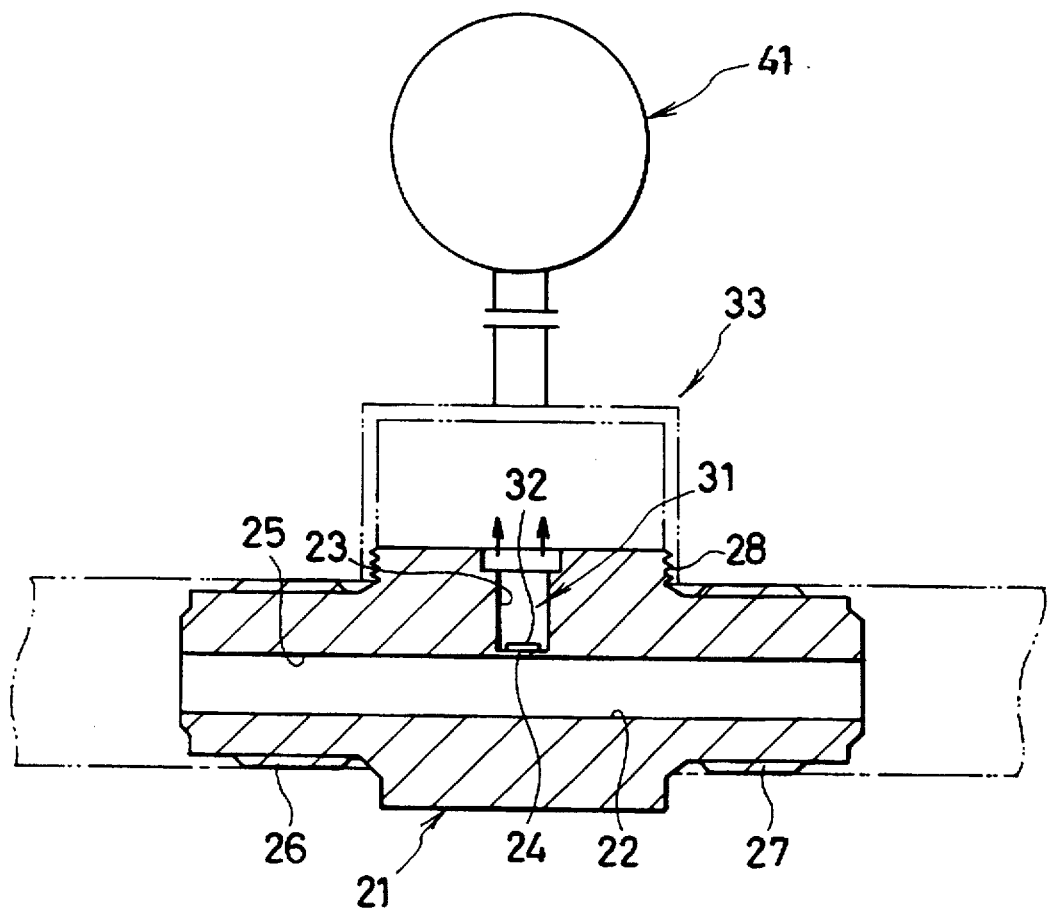
FIG. 1 is a side view side view, partly shown in cross section, of a preferred embodiment of pressure sensing apparatus according to the invention.
Figure 2:
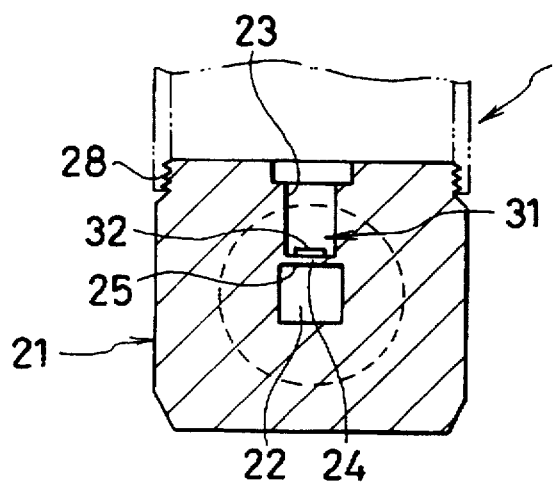
FIG. 2 is a sectional front view of the embodiment of FIG. 1.
Figure 3:
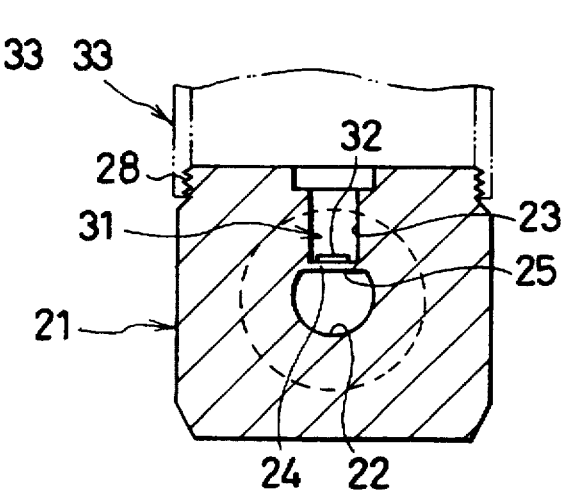
FIG. 3 is a sectional front view of another preferred embodiment of pressure sensing apparatus according to the invention.
Figure 4:
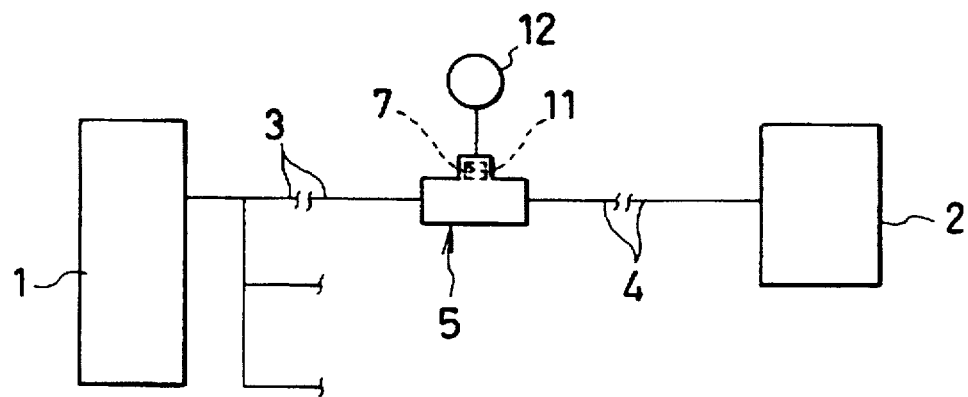
FIG. 4 is a schematic block diagram of a piping system comprising a conventional pressure sensing apparatus.
Figure 5:
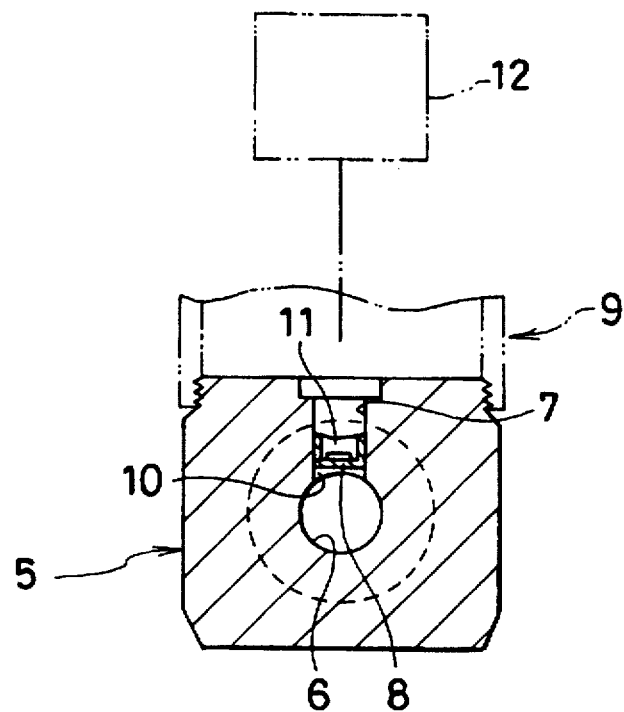
FIG. 5 is a sectional front view of the pressure sensing apparatus of FIG. 4.

FIGS. 1 through 3 illustrate preferred embodiments of the invention.

In FIGS. 1 through 3, reference numerals 21, 31, and 41 respectively denote a sensor holder, a pressure sensor and an indicator.

The sensor holder 21 is made of metal or hardened synthetic resin. A typical example of materials that can be used for the sensor holder 21 is stainless steel (SUS316L).

When the sensor holder 21 is made of metal, it comprises a flow path 22, a sensor receiving hole 23, a diaphragm 24 and other components that are formed by means of metal molding and/or machining (including the use of a wire cutter) and/or electric machining (including electric discharge machining).

The flow path 22 running through the sensor holder 21 from a lateral end to the opposite end thereof has quadrangular cross section as shown in FIG. 2 or an arcuate cross section as illustrated in FIG. 3. In other words, the flow path 22 has a flat surface area 25 running longitudinally as part of the peripheral surface thereof.

It is to be noted that the only requirement for the flow path 22 is that it has a flat surface area 25 and, therefore, its cross section may be other than quadrangular or arcuate and may alternatively be triangular or pentagular.

The sensor receiving hole 23 is cut into the sensor holder 21 from the outer surface of the latter until it gets into the flat surface area 25.

The sensor receiving hole 23 may have a circular or polygonal cross section but normally it has a circular or quadrangular cross section.

The diaphragm 24 is formed in the sensor holder 21 simultaneously with the sensor receiving hole 23.

The diaphragm 24 has an even thickness as the bottom plane of the sensor receiving hole 23 is level with the flat surface area 25 of the flow path 22 and consequently the inner surface of the diaphragm 24 is level with the flat surface area 25.

The sensor holder 21 is provided on the outer periphery at the opposite ends of the flow path thereof with respective threaded sections 26 and 27 and on the outer periphery of the projection thereof where the sensor receiving hole 23 is formed with a threaded section 28 for engagedly receiving the casing.

The pressure sensor 31 may be of any known mechanical, electric or electronic type or a composite type of any combination thereof.

More specifically, the pressure sensor 31 may be of a strain type, semiconductor strain resistance type, a capacitance type or a force balancing transmitter type.

If, for example, the pressure sensor 31 is of a semiconductor strain-resistance, it comprises a sensing device 32 having a strain gauge and ICs as components thereof and arranged in the sensor receiving hole 23 of the sensor holder 21 and an output section (electric arrangement) 33 electrically connected to the sensing device 32 and fitted to the threaded section 28 of the sensor holder 21.

The indicator 41 is also of a known type and comprises an amplifying section, a display section and other components.

The indicator 41 is electrically connected to the output section 33 of the pressure sensor 31.

A pressure sensing apparatus according to the invention and having a configuration as described above is fitted to piping system by means of the threaded sections 26, 27.

Once the apparatus is fitted to a piping system and high pressure gas is made to flow through the piping system, the diaphragm 24 of the apparatus is strained as it is subjected to the high pressure of the gas running through the flow path 22 of the sensor holder 21.

The strain that represents the pressure of the gas running through the piping system is detected by the sensing device 32 of the pressure sensor 31 arranged in the sensor receiving hole 23 of the sensor holder 21 and the electric signal representing the pressure and generated in the sensing device 32 is transmitted to the indicator 41 by way of the 8k output section 33 so that the operator can constantly monitor the gas pressure of the piping system by watching the indicator 41.

A pressure sensing apparatus according to the invention does not have any recess on the inner surface of the low path 22 of the sensor holder 21 that can trap trap gas and adversely affect the operation of the piping system.

Therefore, if the piping system is used to transport a material gas, then, purged by a flow of a purging gas and thereafter used to transport another material gas, the latter material gas is kept pure and clean because no former material gas can can be trapped in the flow path 22 of the sensor holder 21.

Additionally, since gas flows smoothly through the flow path 22 of the sensor holder 21, the diaphragm 24 operates stably without producing turbulences.

A pressure sensing apparatus according to the invention can be used to detect the pressure of the liquid running through a piping system.

While a strain type sensor holder 21 is described above for a pressure sensing apparatus according to the invention, an elbow type, T-type, cross type or any other type sensor holder may alternatively be used for the purpose of the invention. If the sensor holder is of a T-type or cross type, it may additionally operate as a joint for connecting pipes.

(Advantageous Features)

A pressure sensing apparatus according to the invention has the following features.

(Feature 1)

Since the flow path of the sensor holder of the apparatus has a flat surface area and inner surface of the diaphragm is level with the flat surface area, it does not produce any recess that can trap fluid within the flow path. Thus, when the pressure sensing apparatus is connected to a piping system that requires purging operation in order to clean the inside of the pipes of the system, the use of the apparatus does not degrade the purity and cleanliness of the fluid running through the system.

(Feature 2)

Since the diaphragm of the pressure sensing apparatus is formed simultaneously with the sensor receiving hole, the former can be processed accurately without difficulty. In particular, since the diaphragm is integral with the sensor holder, no operation is required to fit the diaphragm to the sensor holder and hermetically seal the sensor holder at the connection of the diaphragm. Thus, the pressure sensing apparatus can be manufactured at the reduced cost.

(Feature 3)

Since no recess is formed in the vital area (the bottom side of the diaphragm) of the flow path of the sensor holder and any fluid can smoothly run through the flow path, the diaphragm can operate stably and accurately. Thus, the pressure sensing apparatus can detect the pressure of the fluid running therethrough with a minimum error level.

What is claimed is:

1. A pressure sensing apparatus comprising a sensor holder including a unitary body having a smooth flow path running therethrough and a pressure sensor arranged in the body characterized in that at least part of an inner surface of the flow path includes a continuous flat surface area directed along the flow path, said body including a sensor receiving hole formed from an outer surface toward the flat surface area and forming a diaphragm unitary with the body, said diaphragm having a constant thickness extending between the flat surface area of the flow path and an inner end of the sensor receiving hole, said diaphragm having an inner surface level and continuous with the flat surface area of the flow path thereby eliminating any material trapping recess in the flow path to enable smooth unimpeded flow through the flow path, said sensor being positioned ins aid sensor receiving hole and associated with said diaphragm.

2. A pressure sensing apparatus according to claim 1, wherein the flow path running through the sensor holder has a polygonal cross section having said flat surface area as part of its inner circumference.

3. A pressure sensing apparatus according to claim 1, wherein the flow path running through the sensor holder has an arcuate cross section having said flat surface area as part of its inner circumference.

4. A holder for a pressure sensing apparatus comprising a body having a flow path for pressurized fluid extending therethrough, said flow path being defined by a longitudinally continuous smooth inner peripheral surface, a portion of said continuous longitudinal surface being flat throughout its length, said body including a bore extending radially inwardly from an outer surface and terminating in a bottom surface adjacent the surface of the flat portion of said flow path, said bottom surface of the bore being aligned with the continuous flat portion of the flow path and adjacent thereto to define a diaphragm of equal thickness throughout the bottom surface of the bore, said diaphragm being unitary with the body and completely isolating the bore from the flow path, said bore adapted to receive a pressure sensitive apparatus for monitoring the fluid pressure passing through the flow path, said smooth inner surface of the flow path eliminating recesses capable of trapping fluid flowing through the flow path, enabling smooth, unimpeded flow through the flow path and enabling the diaphragm to be formed integral with the body by forming the bore to accurately define the thickness of the diaphragm.

5. A pressure sensing apparatus comprising a sensor holder having a smooth flow path running therethrough and a pressure sensor arranged in the sensor holder characterized in that at least part of an inner surface of the flow path includes a continuous flat surface area directed along the flow path, said sensor holder including a sensor receiving hole formed from an outer surface toward the flat surface area and forming a diaphragm having an even constant thickness extending between the flat surface area of the flow path and throughout an inner end of the sensor receive hole thereby isolating the flow path from the sensor receiving hole, said diaphragm having an inner surface level with and forming a continuation of the flat surface area of the flow path thereby eliminating any material trapping recess in communication with the flow path to enable smooth unimpeded flow through the flow path, said sensor being positioned in said sensor receiving hole and associated with said diaphragm.

\* \* \* \* \*